United States Patent
Lempicki et al.

[11] 3,805,187
[45] Apr. 16, 1974

[54] DAMAGE RESISTANT TUNABLE CW DYELASER

[75] Inventors: Alexander Lempicki, Wayland, Mass.; Ralph R. Jacobs, Livermore, Calif.; Harold Samelson, Wayland, Mass.

[73] Assignee: GTE Laboratories Incorporated, Waltham, Mass.

[22] Filed: Nov. 17, 1972

[21] Appl. No.: 307,610

[52] U.S. Cl.............................. 331/94.5, 356/246
[51] Int. Cl................................................ H01s 3/02
[58] Field of Search................... 331/94.5; 356/246

[56] References Cited
UNITED STATES PATENTS
3,678,410  7/1972  Kocher et al.................... 331/94.5
3,725,810  4/1973  Ashkin et al..................... 331/94.5

Primary Examiner—William L. Sikes
Attorney, Agent, or Firm—Irving M. Kriegsman; Robert A. Walsh

[57] ABSTRACT

A damage resistant tunable continuous wave (cw) dye laser comprising a hydro-dynamically contoured interaction region, with a thick input window which is coated to be optically inert to the pumping laser, and a thick output window which is contoured as a lens to emit parallel rays of laser energy. The dye laser is so constructed as to be pumped by a cw laser source whose energy is concentrated in a small area or spot. The intense energy produced by narrowing the pumping laser to a spot produces damaging effects on materials close to the focal point of the pumping laser. Such damaging effects are reduced by removing the damagable materials such as anti-reflective (ar) coatings or mirror systems away from the focal point of the pumping laser because the energy of the laser is spread over a larger area. When the laser energy is distributed over a larger area the energy per square surface area is thereby reduced to a tolerable amount. The pumping laser is focused to a narrow spot within the interaction region of a turbulently flowing liquid dye material, thereby producing a population inversion within the dye material which in turn creates laser action.

10 Claims, 4 Drawing Figures

DAMAGE RESISTANT TUNABLE CW DYELASER

BACKGROUND OF THE INVENTION

The invention herein described was made in the course of contract number DAHC04-71-C-0012, with the Department of the Army.

The invention relates to lasers and in particular to cells for lasers which utilize a flowing liquid as the active material.

Solids, gases and liquids have been used as active materials in lasers. Lasing is initiated by raising the energy levels of the atoms in the active material from the level which they normally occupy to a higher energy level or excited state. This process of excitation is generally accomplished in a liquid laser by a high intensity light source. As hereinafter used, the term "active material" shall refer only to a liquid active material.

When the atoms of the active material are in an excited state, they can be stimulated to emit a photon by interacting with an incident photon. As a result, the incoming photon, or wave, is augmented by the one given up by the excited atom. The released wave falls in phase with the wave that triggered its release. Hence, an amplifying action ensues.

In order to sustain laser operation, the laser cell must be part of a resonant cavity having at least two separated reflecting walls, one of which is partially transmissive. The wave caused by the release of the photon from the atom in the excited state must travel on a path which is substantially parallel to the axis of the resonant cavity so that it can be repeatedly reflected through the active material. As the wave travels through the material it stimulates more atoms to release photons which further amplify and reinforce the wave. Each time the wave is reflected at the partially transmissive reflecting surface, a small portion of it passes through this surface. This small portion constitutes the laser output beam.

Two desirable properties of the laser output beam are coherence and collimation. Optical distortion of the laser output beam shall herein be taken to mean an impairment of either of these properties. The optical characteristic of the liquid active material which primarily determines the quality of the output laser beam is the uniformity of the refractive index of the liquid, which in turn is dependent upon the uniformity of liquid temperature and density. One of the difficulties associated with the use of a liquid as an active material for a laser is that large amounts of heat may be unevenly absorbed by the liquid during excitation. This tends to cause a non-uniform change in the density and temperature and consequently of the refractive index of the liquid causing optical distortion of the laser output beam and a decrease in the output energy of the laser.

When a laser is excited, a large percentage of the input energy absorbed from the excitation source is degraded and appears as heat. This leads to a non-uniform temperature distribution and, in the case of liquids, to severe optical distortion. This distortion is caused by variations in refractive index resulting from density and temperature gradients. If an attempt is made to excite the laser during this time, a wave which is traveling through the active material will be refracted in the direction of higher refractive index as it passes through the liquid. Thus the wave will follow a path which is at an angle to the axis of the resonant cavity. This wave will either leave the resonant cavity before the repeated reflections necessary to sustain laser operation can occur or cause the laser output beam to diverge or lose coherence. The resultant output beam will be optically distorted and have a relatively lower output energy. Further attempts to excite the laser result in a further decrease in output energy and an increase in optical distortion until there is a complete loss of laser output. Typically, between 10 and 30 minutes are required for the static laser to return to equilibrium conditions. Therefore, a relatively long time must elapse between successive excitations of the static laser.

The requirement for a liquid laser which is capable of either high pulse repetition rate or continuous operation led to the development of the flowing liquid laser wherein the liquid active material flows continuously through the laser cell. In the flowing laser, substitution of the liquid flowing into the cell for the liquid which had previously been excited tends to maintain isothermal conditions in the liquid and the cell with the result that the flowing liquid laser can be excited more frequently than the static laser. However, if the flow of liquid through the cell is laminar, a velocity gradient will exist, with the liquid at the periphery of the cell moving slower than the liquid at the central portion of the cell. When the laser is excited, the temperature of the slower moving liquid is raised to a higher temperature than that of the faster moving liquid. This results in the warmer portion of the liquid having a lower density and consequently a lower index of refraction than the relatively cooler portion of the liquid. The differences in the index of refraction within the liquid cause waves which have been emitted by excitation of the active material and which are traveling in different angles as they pass through the liquid, a result similar to that obtained with the static laser. Thus, while higher pulse repetition rates are obtainable, the laser output beam still contains undesirable optical distortion.

Since the optical distortion of the laser output beam is caused primarily by the unequal liquid velocities in the cell, it appeared that this distortion could be substantially eliminated by creating a more uniform liquid velocity. This can be accomplished merely by increasing the flow rate of the liquid through the cell until the flow becomes turbulent. In addition to creating nearly uniform velocity, turbulent flow also increases the mixing of the warmer and cooler liquid layers within the cell with the consequence of further reducing temperature inhomogeneities therein. Under these conditions, it was expected that waves travelling in different portions of the active material of the cell would travel in substantially parallel paths thereby producing an output beam of relatively high output power and relatively low distortion. However, even under turbulent flow conditions, relatively high distortion was found to exist in the laser output beam. Accordingly, we have invented a cell for use in a liquid laser, which has the advantages of using a flowing liquid as the active material while substantially reducing the adverse optical effects found in previous lasers employing liquid active materials.

One configuration utilized to produce high power from a flowing liquid laser is a spherical resonating cavity. Such a cavity requires the pumping laser to be focused to a very small spot within the active material.

The spherical resonator has two major design problems. The first problem relates to the intense energy generated by focusing the pumping beam to a spot and the damage which may be caused thereby to the intervening optics and then surface coatings. The second problem relates to the hydrodynamics of the active material as it flows through the interaction region. It is therefore an object of this invention to provide a dye cell design which will solve these problems and produce an efficient continuous high power flowing liquid laser.

SUMMARY OF THE INVENTION

The present invention relates to a laser which utilizes a flowing liquid as the active material which is pumped by a laser source. More specifically, the present invention relates to an improved dye cell for use in a continuous operation dye laser.

The cw or continuous dye laser includes a resonator, circulation system, pumping gas laser, and associated optics. The dye resonator comprising two mirrors are placed coaxial with the pumping laser and external to the dye cell. The active material is confined to the optical center of this resonator and is bounded by two windows. A lens external to the cell of radiation concentrates the pumping beam to a nearly diffraction limited spot at the center of the interaction region. When a sufficient amount of energy is introduced into the interaction region, a population inversion of the active material ensues and laser action is generated.

The present invention utilizes optical elements that are designed to couple the pumping radiation from a gas laser efficiently into a stable and durable dye laser cavity. In addition, as with all liquid lasers, a circulatory system must be provided to remove from the laser liquid any deposited heat and furnish an optical medium as lossless as possible. The major components of the laser system comprise a continuous wave pumping laser followed by an input element, then the cell and finally the output mirror. A variety of tuning elements such as an interferometer or prism can be inserted between the cell and the output mirror to tune the output beam over a number of wavelengths.

The input optical element has two functions. The first is to couple the transverse modes of the pumping laser and the dye cavity. The other function of the input element is to serve as the totally reflecting mirror of the spherical dye laser cavity. Combining the two functions in a single element simplifies the alignment procedure and eliminates two potentially lossy surfaces. The dielectric coating is highly reflecting in the region of the useful emission and as transparent as possible to the pumping laser emission.

The cell serves two functions: as an optical element in the cavity and as a means for controlling the flow characteristics of the laser liquid. From an optical point of view the cell consists of two plane convex lenses with the two plane surfaces parallel to each other and separated by the thickness of the active medium of the laser. The lens surface facing the pumping beam has a radius curvature corresponding to the mode radius of the pump laser beam at that point. The surface facing the output components has a radius of curvature making it a collimating lens for the dye laser beam. Both curved surfaces are anti-reflection coated. The lenses are made of a single thick piece of material such as quartz to reduce the intensity of the pumping laser beam at the anti-reflection coating, thus reducing thermal damage to the coating. Each quartz piece is carefully cemented into a metal holder and the two assemblies are separated by a spacer which is shaped to reduce the volume in the interaction region and thereby increase the flow velocity through the interaction region. The cell components are carefully located in a stainless steel cylinder so that the flow path in the cell is lined up with the pipe aperture which supplies the active material in the interaction region.

Further features and advantages of the invention will become more readily apparent from the following detailed description of a specific embodiment of the invention when taken in conjunction with the accompanying drawings. In the several figures like reference numerals identify like elements.

DESCRIPTION OF THE PREFERRED EMBODIMENT

Figure 1:
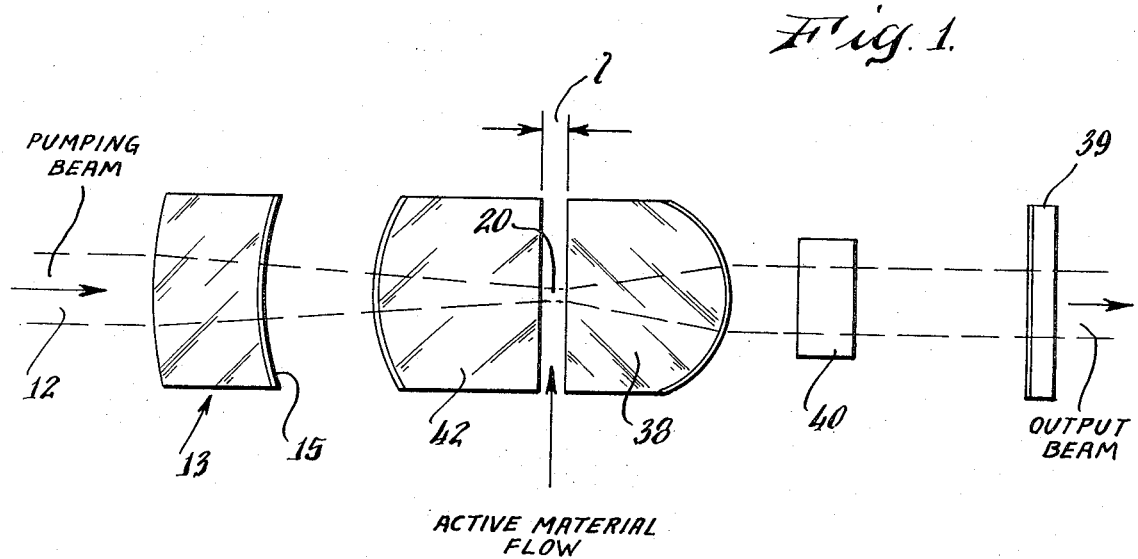
FIG. 1 is a representation of the optical elements arranged in accordance with this invention.
Figure 2:
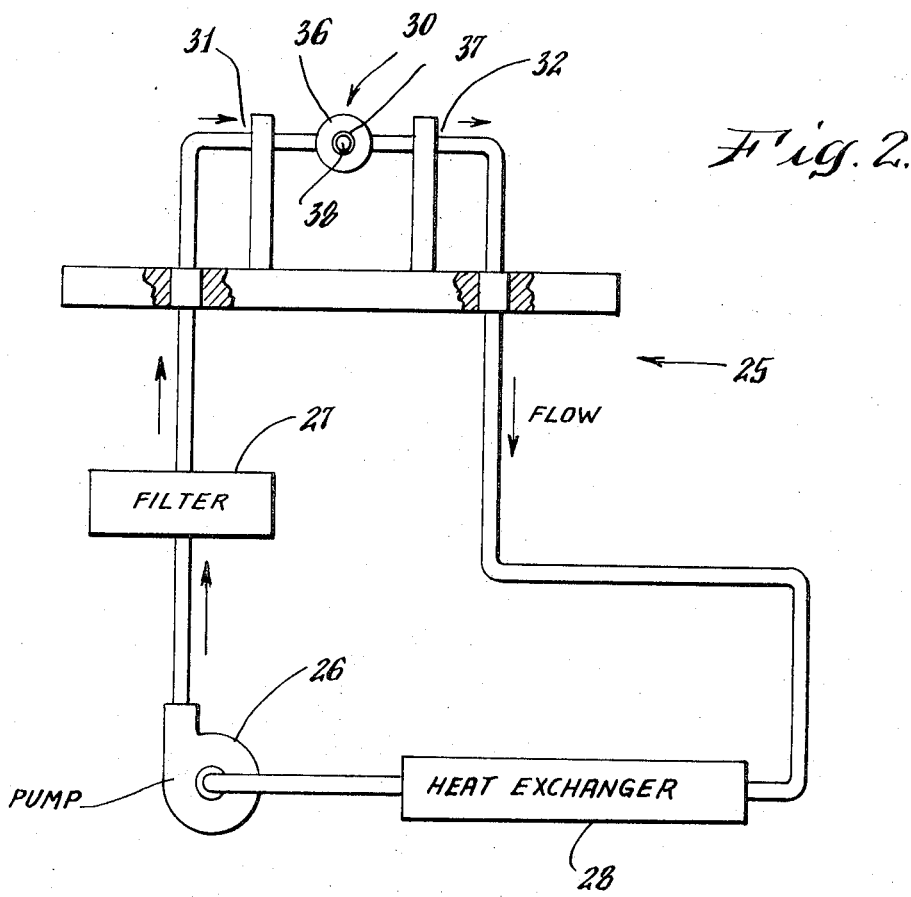
FIG. 2 is a diagramatic representation of the circulation system in accordance with this invention.

Discussion now proceeds to a description of the preferred embodiment of the invention, attention is directed to FIGS. 1 and 2 which illustrates continuous wave (cw) liquid laser in accordance with the invention. The present invention utilizes cw pumping laser which could be any commercially available laser which is capable of exciting the liquid laser material, as for example, an argon-ion gas laser emitting a beam 1.27mm in diameter at 5,145° A. This laser is effective to excite a liquid lasing medium, such as Rhodamine 6G solution. The pumping laser beam is passed through a lens system to focus the beam to a spot within the liquid lasing material. The interaction of the pumping laser and liquid produces a population inversion of the liquid laser material which then emits radiation into a modified spherical resonator formed by two optically alligned mirrors which are arranged coaxially with the pumping laser. One of the mirrors passes a portion of the stimulated emission from the liquid laser to form an output beam. A tuning device may be placed within the resonator to change the output wavelength of the transmitted beam.

The discussion now proceeds to a detailed description of the laser pump and optics used in the cw liquid laser in accordance with the invention. Attention is therefore directed to FIG. 1 wherein is illustrated the pumping beam 12 which is focused by optical input element 13. The input element 13 couples the transverse modes of the pumping beam 12 into the transverse modes of the liquid laser cavity within the interaction region 20. For example, the beam of an argon-ion laser having a 1.27mm diameter is focused by contouring the surfaces of element 13 as a lens to narrow the input beam to a waist diameter of 25$\mu$ in the active liquid laser medium. The surface 15 of element 13 is coated to provide a totally reflecting surface serving as a portion of the modified spherical resonator described further hereinafter. Combining the two functions, focusing and reflecting, into a single element 13 simplifies the alignment procedure and eliminates two potentially lossy surfaces.

After the input beam 12 passes through element 13 it enters the lasing cell which includes two thick optical elements 42 and 38 made of suitable material such as quartz of Pyrex. The elements are separated by the thickness of the interaction region of the laser material flowing through the system. The focused input beam 12 passes through element 42. The surface of element 42 facing the pump beam has a radius of curvature corresponding to the mode radius of the pump laser beam at that point. The surface of element 38 facing away from the pump beam has a radius of curvature making it a collimating lens for the output laser beam. Both curved surfaces are anti-reflection coated to reduce Fresnel losses. If the elements 42 and 38 are thin (a millimeter or so) the coatings are rapidly destroyed by the high intensity of the pumping and lasing beams so close to the focus. A solution is to make the elements 42 and 38 about an inch thick, thus reducing the power density on the coated surfaces by a factor of about 70, well below the damage point. Both elements 42 and 38 have plane surfaces in contact with the active medium acting as a window and contact surfaces for the liquid lasing material. The combination from the optical point of view consists of two plane-convex lenses wherein one surface is a flat window and the other surface is optically contoured to reduce the number of optical elements necessary to ease alignment and thereby avoid possible losses.

Each element 38 and 42 is carefully cemented into a flanged plug and the two plugs are separated by plates shaped to reduce the flow volume in the interaction region. The cell components are carefully located in a support structure so that the flow path in the cell is lined up with the pipe aperture in the support. A more detailed description of the structural design is discussed hereinafter.

The intra-cavity collimating lens 38 ground into the cell window, together with the flat output mirror 39 situated some distance away from the lens, effectively replaces the second half of the spherical resonator, the first half involving spherical mirror 15. The equivalence of the modified spherical resonator wherein one half of the resonator is spherical and the other half is collimated to a parallel beam is well known in the field. The space between the cell and the mirror 39 can be conveniently used for the insertion of various intra-cavity elements 40 for tuning the output. The spacing between the cell and mirror 39 is not at all critical but for optimum results, the theory of intra-cavity lenses prescribes a curved output mirror (about 1½ m radius of curvature) whereas a flat one was primarily used. Brief investigations using curved output mirrors near the proper radius provided about 10 percent to 12 percent increases in the output powers.

Spectral tuning of the laser output beam can be achieved in several ways such as: (1) dye concentration tuning; (2) effective concentration tuning by varying ratio of active length to total laser length; (3) diffraction grating tuning; (4) an echelle grating in conjunction with an intra-cavity Fabry-Perotetalon; (5) a Fabry-Perot interferometer; (6) Littrow mounted prism tuning; (7) temperature tuning; and (8) by varying concentration ratios of a two component laser solution as in a rhodamine 6G and rhodamine B mixture.

In the present invention, initially a Brewster prism was used as a tuning device 40, however, better results are obtained if one combines the device 40 with the output mirror 39. The combination may be achieved by using a Brewster faced Littrow prism suitably coated on the output face. The use of the Brewster-Littrow prism (typical transmission from 0.5 to 7.0 percent in the lasing range) simplifies the alignment and reduces by one the number of intra-cavity surfaces.

Tuning the liquid laser can also be achieved with a commercially available rotatable pellicle as device 40 used in conjunction with a broad band flat mirror 39. The rotation of the pellicle provides a variable period channel spectrum sufficient to tune the laser over the entire range of the liquid. The advantage of this scheme is that the output is always colinear with the laser axis.

The discussion now proceeds to a detailed description of the circulation system and cell. The module, generally designated 25, is illustrated schematically in FIG. 2. The module 25 comprises a circulation system which includes a pump 26, such as a commercially available variable speed, magnetically coupled, centrifugal pump; a filter 27, such as $1.5\mu$ porosity Millipore filter; and a conventional heat exchanger 28. The circulation system circulates, cools and filters the liquid laser material flowing through the module 25. The liquid laser material enters the lasing cell, generally designated 30 through input port 31 and leaves through outlet port 32. The liquid laser material flows in a hydrodynamically turbulent manner through the cell 30 for reasons discussed hereinbefore.

Figure 3:
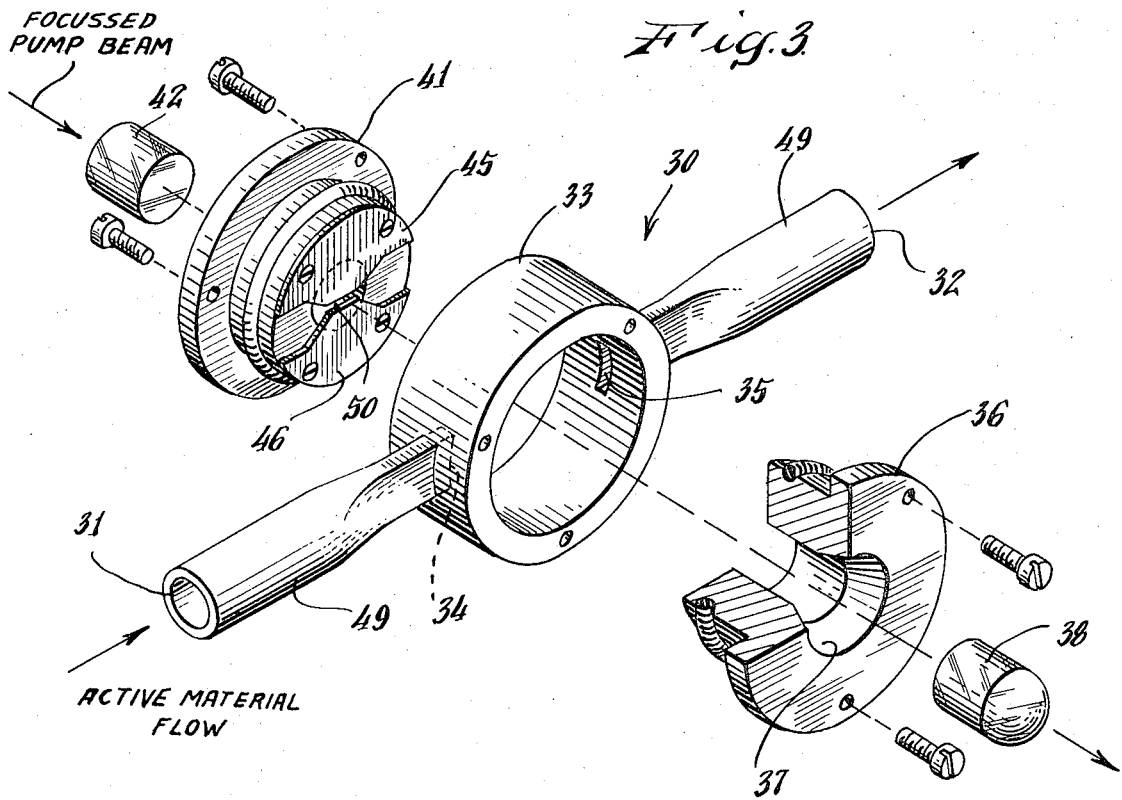
FIG. 3 is a perspective view with parts disassembled of the cell of this invention.
Figure 4:
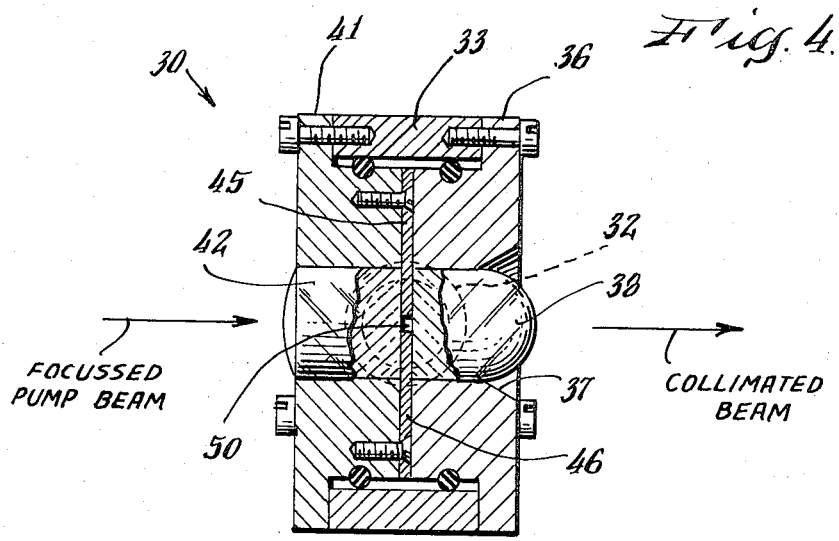
FIG. 4 is a cross sectional view of the assembled cell of this invention.

The lasing cell 30, as illustrated in FIGS. 3 and 4, includes a rigid hollow cylindrical support 33 having a rectangular input port 34 and rectangular output port 35. A first removable flanged plug 36 is sealably mounted in the support 33, the plug having an opening with a flared aperture 37 in which is sealably positioned the collimating element 38 for transmitting the collimated output beam. A second removable flanged plug 41 is sealably mounted in the support 33 opposed to plug 36. The second plug has an opening in which the input element 42 is sealably positioned for receiving the focused input beam 12. Intermediate the two plugs is positioned two contoured thin plates, 45 and 46. These plates form a separator between the two plugs 36 and 41 and form a channel through which the hydrodynamically turbulent liquid lasing material flows.

The thin plates may be constructed of material which will not interact with the lasing material such as stainless steel or teflon. The plates are contoured so as to provide a wide cross sectional area at the inlet 34 and outlet 35 port and a restricted cross sectional area in the vicinity of the laser interaction region generally designated 50.

In operation the liquid lasing material is accelerated through the circulation system by pump 26, through filter 27 and into inlet 31. After the material is received into inlet 31 the tubing 49 is contoured to a rectangular cross section to provide a smooth transition through inlet port 34 of the support 33. The flowing active material is restricted to a narrow cross sectional area by plates 45 and 46 as it passes through the interaction region 50 wherein the flow velocity reaches a maximum. After passing through the interaction region 50, the liquid lasing material passes through rectangular outlet 35 of the support 33 into outlet 32. The liquid lasing material then is passed through a heat exchanger 28 and returned to pump 26 for recirculation.

Apparatus built in accordance with the invention utilized a coherent radiation Model 52B Argon-Ion cw laser which has 1.27mm diameter output beam at 5,145$_A$ with a power of 1 watt. Tuning is achieved with Brewster angled quartz prisms of the Littrow type whose output transmission was varied. The active material comprised a $2 \times 10^{-4}$ Mole solution of Rhodamine 6G obtained from a variety of commercial sources and purified at least twice by a solvent extraction technique. The solvent used in the active material was distilled water with a 1.5 percent Ammonyx LO addition. The final solution was filtered once to remove gross particles and used directly without any attempt to remove the dissolved atmospheric gases.

The argon laser beam is focused to a 25$\mu$ spot at a power density of 300 KW/cm$^2$ within the 1mm interaction region of the cell. The resonator was so designed that the pumping beam when injected into the interaction region should excite the lowest order transverse mode. Since the resonator and pumping beam are operating at different wavelengths, complete overlapping of the two regions is impossible. For efficiency, a choice was made to make the waist of the focused pumping beam equal to the liquid waist mode of the resonator. The circulation system includes a Microtol centrifugal pump (model number 7004-60), a 1.5$\mu$ porosity Millipore filter and a glass chemical condenser used as a heat exchanger. The connecting tubing of corrugated teflon serves to dampen the pump vibrations. The maximum linear flow speed through the interaction region was measured to be 20m/sec.

The output characteristics of the laser are shown in the Table below.

TABLE I

Characteristics of Liquid Laser Output

| | |
|---|---|
| Wavelength | 5800-6200 |
| Power | greater than 100mw |
| Linewidth | 10A to less than 1A |
| Beam Diameter | 1 – 2mm |
| Beam Quality | nearly diffraction limited |
| Conversion Efficiency | 20% |

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. Apparatus for producing stimulated radiation in a flowing liquid laser material comprising:
   a. a pumping laser emitting a beam of pumping radiation;
   b. focusing means positioned to focus said beam substantially to a spot within said laser material causing a population inversion therein for producing an output laser beam;
   c. a container having an inlet, outlet and a channel positioned therebetween, said channel having a restricted area wherein the flow velocity of said laser material is increased to substantially turbulent flow;
   d. a first convex-planar optical element sealably mounted in said container adjacent said restricted area, said convex portion coaxial with and receiving said focused beam and transmitting said focused beam through said planar portion of said first element, said planar portion being in contact with said flowing material, for providing an input window for said container;
   e. a second convex-planar optical element sealably mounted in said container adjacent said restricted area, said second optical element positioned coaxial with said pumping beam and transmitting said output laser beam, said planar portion being in contact with said flowing material and said convex portion spaced away from said planar portion, said convex portion collimating said output beam;
   f. liquid pumping means for circulating said liquid laser material through said container; and
   g. optical cavity means spaced from said container for intensifying said stimulated radiation emitted from said liquid laser material coaxial with said pumping beam, said optical cavity means having reflecting axis substantially coincident with said line of focus of pumping radiation.

2. Apparatus according to claim 1 wherein said pumping laser means is an argon-ion gas laser.

3. Apparatus according to claim 1 wherein said laser material is Rhodamine 6G.

4. Apparatus according to claim 1 wherein said channel includes two hydrodynamically contoured plates oppositely disposed spaced from each other, adjacent said first and second optical element.

5. In apparatus for producing stimulated radiation in a flowing liquid laser material having a liquid pump for circulating said laser material, a pumping laser emitting a beam of radiation, a focusing lens positioned to focus said beam into the population inversion region of said liquid laser material and an optical cavity for intensifying stimulated radiation emitted from said laser material the improvement comprising:
   a. a cell coupled in circuit with said liquid pump said cell having a front window through which said pumping beam of radiation passes, and a rear window opposite and spaced away from said front window; and
   b. two hydrodynamically contoured plates in said cell intermediate and spacing said front and rear window, said contoured plates providing a restricted portion wherein the flow velocity is increased to substantially turbulent flow throughout said population inversion region.

6. Apparatus as defined in claim 5 wherein said front window is a convex planar optical element whose thickness dimension is large as compared to the spacing between windows for moving said convex surface away from said population inversion region thereby distributing said pumping beam over a large surface area of said convex surface.

7. Apparatus as defined in claim 6 wherein said convex surface of said front window is anti-reflective coated.

8. Apparatus as defined in claim 5 wherein said rear window is a planar convex optical element whose thickness dimension is large as compared to the spacing between windows for moving said convex portion away from said population inversion region, said convex portion positioned to collimate said stimulated radiation.

9. Apparatus as defined in claim 8 wherein said convex surface of said rear window is anti-reflective coated.

10. Apparatus as defined in claim 5 wherein the laser material is Rhodamine 6G.

* * * * *